No. 891,768. PATENTED JUNE 23, 1908.
L. FRITZ.
BEAM SCALE.
APPLICATION FILED MAR. 24, 1908.
2 SHEETS—SHEET 1.
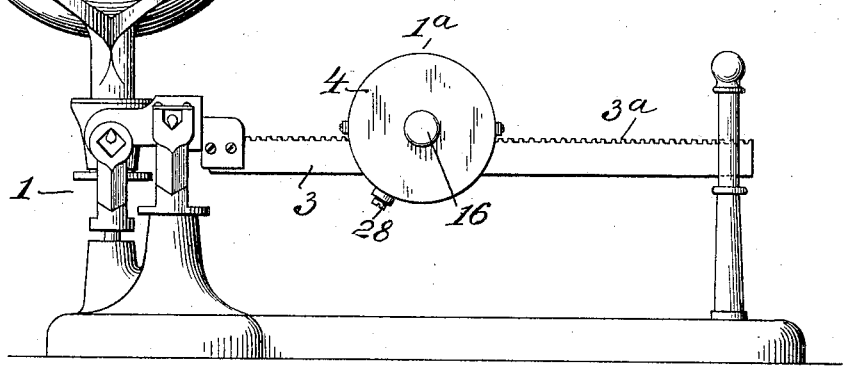
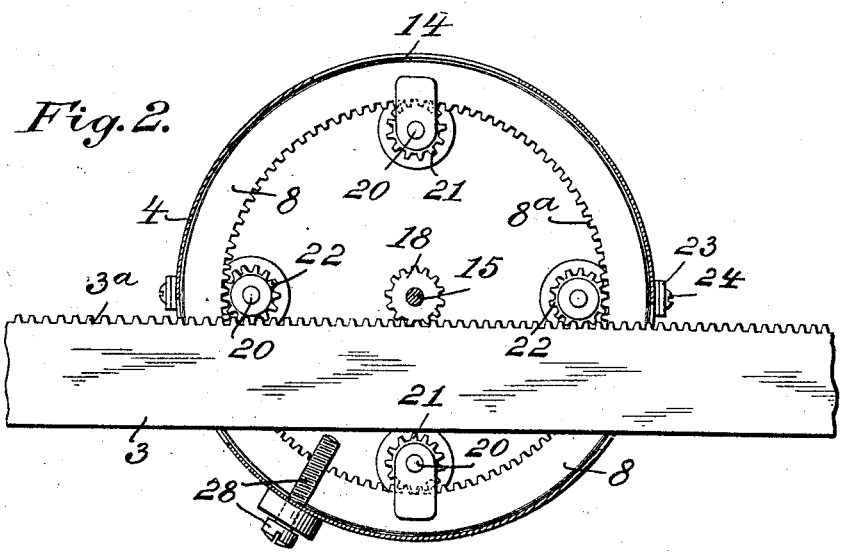
WITNESSES:
Wilhelm Vogt
Thomas M. Smith
INVENTOR
Louis Fritz
BY
J. Walter Douglas
ATTORNEY.

No. 891,768. PATENTED JUNE 23, 1908.
L. FRITZ.
BEAM SCALE.
APPLICATION FILED MAR. 24, 1908.
2 SHEETS—SHEET 2.
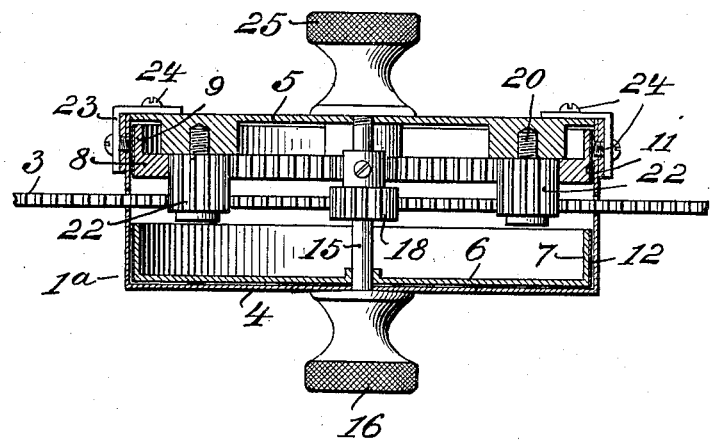
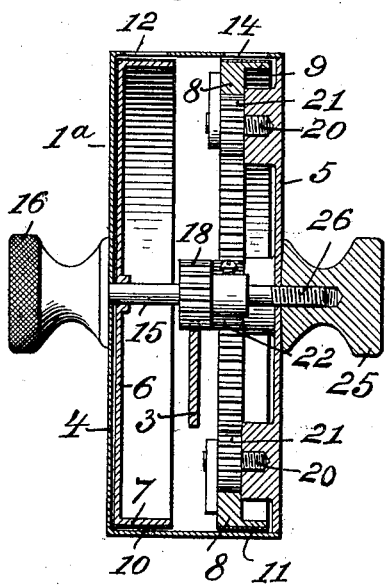
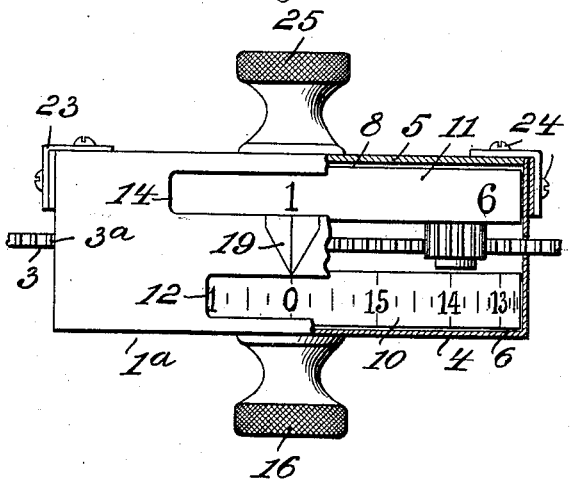
WITNESSES:
INVENTOR
Louis Fritz,
BY
ATTORNEY.

UNITED STATES PATENT OFFICE.

LOUIS FRITZ, OF PHILADELPHIA, PENNSYLVANIA, ASSIGNOR TO CHARLES E. TROEMNER, OF PHILADELPHIA, PENNSYLVANIA.

BEAM-SCALE.

No. 891,768.  Specification of Letters Patent.  Patented June 23, 1908.

Application filed March 24, 1908. Serial No. 422,977.

*To all whom it may concern:*

Be it known that I, LOUIS FRITZ, a citizen of the United States, residing at the city of Philadelphia, in the county of Philadelphia and State of Pennsylvania, have invented certain new and useful Improvements in Beam-Scales, of which the following is a specification.

My invention has relation to a type of beam scales for weighing articles such as meats, groceries or the like; and in such connection it relates particularly to the constructive arrangement of the weight used on such scales adapted to be impelled step-by-step along the teeth of the scale beam so as to readily and quickly in pounds or ounces or both determine accurately the weight of the article placed in the scoop or upon the platform thereof.

The nature, characteristic features and scope of a beam scale containing or embodying the defined features of a weight of my invention has by the arrangement thereof the capacity for readily and quickly determining by shifting on the beam the accurate registry in pounds or ounces or both of the article to be weighed, as well as permitting by its constructive arrangement at any fixed point in the shifting, of the weighing of articles of corresponding weight without disturbing the weight, in its certain shifted position on the beam.

In the accompanying drawings showing the principle underlying my invention of a practical application thereof, Figure 1, is a side elevational view of a beam weighing scale embodying the main features of my said invention. Fig. 2, is vertical sectional view through the weight and showing in broken section, a portion of the beam of the weighing scale. Fig. 3 is a horizontal sectional view of the scale weight looking down upon the scale beam, showing the internal arrangement of the weight for controlling in its movement the shifting of the dials for pounds and ounces, and also showing the means for tightening the weight in any certain position on the beam and other means for shifting the weight on the beam. Fig. 4, is a cross-sectional view through the weight of Fig. 1; and Fig. 5 is a top or plan view of the housing of the weight, broken away, with the dial openings for "pounds" and "ounces" containing numerals arranged upon fillets or disks and exposed through the openings by shifting the weight step-by-step along the rack of the scale beam.

Referring to the drawings 1, is a scale of well known construction carrying a scoop 2, on the beam 3, of which is slidably arranged a weight, consisting mainly of a housing $1^a$, formed of sections 4 and 5, a disk or wheel 6, and an annulus 8, as well as several other parts to be hereinafter fully explained. To each of the flanges 7 and 9, of the wheel 6 and annulus 8, are secured a strip of paper or tape 10 and 11, respectively, a certain portion of which is visible through openings 12 and 14, arranged in the section 4 of the housing $1^a$, as shown in Fig. 5. The wheel 6, the tape 12, of which is divided into sixteen sections corresponding in number to the sixteen ounces in a pound, is rigidly secured to the shaft 15, passing through both sections 4 and 5, of the housing. This shaft 15, is rotated by a knob or handle 16, and is provided with a pinion 18, meshing with the teeth $3^a$, of the beam 3, as shown in Fig. 2. The shaft 15, when rotated will through the intervention of the pinion 18, move the weight so formed back and forth on the beam 3, for a predetermined distance, and the displacement of the weight on the beam 3, in a certain direction will after a complete revolution of the pinion 18, balance one pound by weight of an article placed upon the scoop 2 of the scale 1 as shown in Fig. 5. At the same time this complete revolution of the wheel 6, will be indicated by a zero mark on the strip 10, carried by this wheel which in this instance occupies a position opposite the pointer 19, carried by the section 4, of the housing, as shown in Fig. 5, while the numeral 1, on the annulus 8, indicating one pound by weight likewise occupies a position opposite the pointer 19.

The movement of the annulus 8, is accomplished as follows: To the section 5, of the housing by means of bolts 20, are secured two sets of pinions 21 and 22, meshing with the teeth $8^a$, of the annulus 8, and thus movably holding the same in proper position with respect to the section 5, of the housing. This section is removably connected with the section 4, preferably by means of brackets 23, and bolts 24, and is thus normally prevented from turning in the section 4. As shown in Figs. 3 and 5, the set of pinions 22, extend beyond the annulus 8, and engage and mesh with the teeth or rack $3^a$, of the beam 3. By the rotation of the pinion 18, of the wheel 6, the sections 4 and 5, of the housing are slid along the beam 3, by which movement through the intervention of the rack 3ª, of the beam, the pinions 22 are rotated which in turn actuate the annulus 8. The arrangement of the pinions 22 with respect to the pinion 18 of the wheel 6, is such as that when the pinion 18, makes six complete revolutions, the annulus 8, at the same time will make one complete revolution. The strip 11, carried by the annulus 8, is therefore divided into six sections corresponding to six pounds by weight. Thus when the zero mark on the wheel 6 occupies a position directly opposite the pointer 19, the mark 1 on the strip carried by the annulus 6 will be moved in a similar position opposite this pointer as the annulus 6 is moved in this instance for the distance of one sixth of its circumference. If the weight of the article is more than one pound the 1 marked on the annulus 8 will still be visible through the opening 14, of the housing, while opposite the pointer 19, will be brought that numeral of the disk 6, which corresponds with the number of ounces the article weighs over one pound. Therefore, the weight of the article in pounds and ounces will be visible through the respective openings 12, and 14, in the section 4, of the housing since the housing is moved on the beam 3, by the pinion 18, of the shaft 15, which rotates the disk 6, while the annulus 8, is moved by the beam 3, and the set of pinions 22, meshing therewith. The housing can be clamped to the beam 3, by means of a knob 25, engaging the threaded portion 26, of the shaft 15, as shown in Fig. 4. By advancing the knob 25, on the threaded portion of the shaft and bringing the knob into engagement with the section 5, of the housing 1ª, the friction between the same and the section 5, is sufficient to prevent the rotation of the shaft 15, and the pinion 18, and thus to hold the housing in any given position on the beam 3, by the teeth 3ª thereof. A certain weight to which the scale 1, has been adjusted when the housing has been locked to the beam 3 will thus be maintained by the same until it again becomes necessary to weigh articles of less or greater weight, which is readily accomplished by bringing the knob 25, out of engagement with the section 5, of the housing 1ª. At the same time a lifting of the sections 4 and 5, of the housing 1ª, on the beam 3, and thus a disengagement of the pinion 18, of the wheel 6, and of the set of pinions 22, of the annulus 8, are prevented by a threaded bolt 28, carried by the section 4, of the housing, by terminating with the free end in proximity to the underside of the beam 3. Thus the housing 1ª, can readily be slid along over the beam 3, while an upward movement of the same will be prevented by the bolt 28, abutting against the beam 3. On the other hand when the bolt 28, is withdrawn for a distance sufficient to permit of the disengagement of the pinions 18 and 22, from the rack 3ª, of the beam 3, by raising the housing 1ª, therein, the position of the wheel 6 and annulus 8, with respect to the beam 3, and to each other may be readily adjusted without necessitating the opening of the housing.

Having thus described the nature and objects of my invention what I claim as new and desire to secure by Letters Patent is:

1. A beam scale weight, comprising a housing through which the beam of the scale passes, a wheel and an annulus having numerals displayed on the perimeters thereof within the housing, means carried by the housing and passing through the annulus adapted when rotated to move the housing on the beam and to rotate the wheel, and means engaging the beam and annulus adapted when moved on the beam to rotate the annulus by the beam at a speed differing from that of the wheel.

2. A toothed beam scale weight, comprising a housing through which the toothed beam of the scale passes, a wheel and a toothed annulus having numerals displayed thereon and arranged in said housing, a shaft carried by said housing supporting said wheel and having a pinion meshing with the teeth of said beam, said shaft when rotated adapted to move by said pinion the housing on the beam and to rotate the wheel, and pinions carried by the housing engaging the teeth of the annulus and beam, said pinions when rotated by the beam by the movement of said housing adapted to rotate said annulus at a speed differing from that of said wheel.

3. A toothed beam scale weight, comprising a housing through which the toothed beam of the scale passes, a wheel and a toothed annulus having numerals displayed thereon and arranged in said housing, a shaft carried by said housing supporting said wheel and having a pinion meshing with the teeth of said beam, said shaft when rotated adapted to move by said pinion the housing on the beam and to rotate the wheel, pinions carried by the housing engaging the teeth of the annulus and beam, said pinions when rotated by the beam by the movements of said housing adapted to rotate said annulus at a speed differing from that of said wheel, and means engaging the shaft and adapted when brought into engagement with the housing to lock the same to said beam by preventing rotation of the shaft.

4. A toothed beam scale weight, comprising a housing through which the toothed beam of the scale passes, a wheel and a toothed annulus having numerals displayed thereon and arranged in said housing, a shaft carried by the housing supporting the wheel and having a pinion meshing with the teeth of the beam, said shaft when rotated adapted to move by the pinion the housing on the beam and to rotate the wheel, pinions carried by the housing and engaging the teeth of the annulus and beam, said pinions when rotated by the beam by the movement of said housing adapted to rotate the annulus at a speed differing from that of the wheel and a knob carried by the shaft and adapted when brought into engagement with said housing to prevent rotation thereof.

5. A toothed beam scale weight, comprising a housing through which the toothed beam of the scale passes, a wheel and a toothed annulus having numerals displayed thereon and arranged in said housing, a shaft carried by the housing supporting the wheel and having a pinion meshing with the teeth of the beam, said shaft when rotated adapted to move by the pinion the housing on the beam and to rotate the wheel, pinions carried by the housing and engaging the teeth of the annulus and beam, said pinions when rotated by the beam by the movement of said housing adapted to rotate the annulus at a speed differing from that of the wheel, a knob carried by the shaft and adapted when brought into engagement with said housing to prevent rotation thereof, and means carried by the housing and adapted by terminating in proximity to the beam to prevent disengagement of the pinions from the teeth of said beam.

6. A toothed beam scale weight, comprising a housing through which the toothed beam of the scale passes, a wheel and a toothed annulus having numerals displayed thereon and arranged in said housing, a shaft carried by the housing supporting the wheel and having a pinion meshing with the teeth of the beam, said shaft when rotated adapted to move by the pinion the housing on the beam and to rotate the wheel, pinions carried by the housing and engaging the teeth of the annulus and beam said pinions when rotated by the beam by the movement of said housing adapted to rotate the annulus at a speed differing from that of the wheel, a knob carried by the shaft and adapted when brought into engagement with said housing to prevent rotation thereof, and a threaded bolt carried by the housing and terminating in proximity to the beam so that when withdrawn a certain distance therefrom is permitted the disengagement of the pinions from said beam.

In testimony whereof, I have hereunto set my signature in the presence of two subscribing witnesses.

LOUIS FRITZ.

Witnesses:
   J. WALTER DOUGLASS,
   THOMAS M. SMITH.